US012746645B2

(12) United States Patent
Zheng et al.

(10) Patent No.: US 12,746,645 B2
(45) Date of Patent: Sep. 29, 2026

(54) IMPACT TOOL

(71) Applicant: Nanjing Chervon Industry Co., Ltd., Nanjing (CN)

(72) Inventors: Yuyi Zheng, Nanjing (CN); Shaobo Liu, Nanjing (CN); Shubin Tong, Nanjing (CN); Haonan Du, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 8 days.

(21) Appl. No.: 18/945,656

(22) Filed: Nov. 13, 2024

(65) Prior Publication Data

US 2025/0205857 A1 Jun. 26, 2025

(30) Foreign Application Priority Data

Dec. 22, 2023 (CN) ......................... 202311788228.7
Dec. 22, 2023 (CN) ......................... 202323530966.X

(51) Int. Cl.
*B25B 21/02* (2006.01)
*B25F 5/00* (2006.01)

(52) U.S. Cl.
CPC .............. *B25B 21/02* (2013.01); *B25F 5/001* (2013.01)

(58) Field of Classification Search
CPC ................................. B25B 21/02; B25F 5/001
See application file for complete search history.

(56) References Cited

U.S. PATENT DOCUMENTS

| | | | | |
|---|---|---|---|---|
| 2012/0111592 | A1* | 5/2012 | Limberg | B25B 23/1405 173/48 |
| 2013/0033217 | A1* | 2/2013 | Hirabayashi | B25D 16/006 318/546 |
| 2021/0107131 | A1* | 4/2021 | Kuehne | B25F 5/001 |
| 2021/0276164 | A1* | 9/2021 | Kumagai | B25F 5/008 |
| 2023/0182270 | A1* | 6/2023 | Hirabayashi | B25B 23/18 173/93.5 |
| 2023/0268866 | A1* | 8/2023 | Friedman | H02P 3/06 173/93.5 |

* cited by examiner

*Primary Examiner* — Michelle Lopez
(74) *Attorney, Agent, or Firm* — Greenberg Traurig, LLP

(57) ABSTRACT

An impact tool includes: an impact mechanism applying an impact force to an output shaft, where the impact mechanism includes an impact block driven by a motor and a hammer anvil mating with the impact block and impacted by the impact block; a transmission mechanism configured to transmit torque outputted from a drive shaft to the output shaft, where the transmission mechanism includes a multi-stage transmission assembly; and a direct current power supply powering at least the motor, where the nominal voltage of the direct current power supply is less than 18 V, and fastening torque of the output shaft on a workpiece is greater than or equal to 170 N·m.

20 Claims, 9 Drawing Sheets

IMPACT TOOL

RELATED APPLICATION INFORMATION

This application claims the benefit under 35 U.S.C. § 119(a) of Chinese Patent Application No. 202311788228.7, filed on Dec. 22, 2023, and Chinese Patent Application No. 202323530966.X, filed on Dec. 22, 2023, which applications are incorporated herein by reference in their entireties.

TECHNICAL FIELD

The present application relates to the field of power tools and, in particular, to an impact tool.

BACKGROUND

An impact tool refers to a tool capable of outputting rotational movements at a certain impact frequency. Common impact tools include an impact wrench, an impact screwdriver, an impact drill, and the like. The impact wrench is typically used for screwing bolts, nuts, and the like. The impact screwdriver is typically used for loosening or tightening screws and the like. The impact drill is typically used for drilling holes through impact.

To output the rotational movements at a certain impact frequency, the impact tool typically includes an output assembly for outputting a rotational force and an impact mechanism for impacting the output assembly cyclically.

Among products in the related art, impact tools outputting higher impact torque require higher output power from direct current power supplies to output higher torque.

This part provides background information related to the present application, and the background information is not necessarily the existing art.

SUMMARY

An impact tool includes: a motor including a drive shaft that rotates about a first axis; an output shaft including an output axis defined by the output shaft, where the output shaft rotates about the output axis to output power; an impact mechanism applying an impact force to the output shaft, where the impact mechanism includes an impact block driven by the motor and a hammer anvil mating with the impact block and impacted by the impact block; a transmission mechanism configured to transmit torque outputted from the drive shaft to the output shaft, where the transmission mechanism includes a multi-stage transmission assembly; and a direct current power supply powering at least the motor, where the nominal voltage of the direct current power supply is less than 18 V, and fastening torque of the output shaft on a workpiece is greater than or equal to 170 N·m.

In some examples, the multi-stage transmission assembly includes at least two stages of planet gear reduction assemblies.

In some examples, the multi-stage transmission assembly includes: a first planet carrier disposed in front of the motor; first planet gears supported by the first planet carrier; a second planet carrier disposed in front of the first planet carrier; second planet gears supported by the second planet carrier; and an inner ring gear causing at least the second planet gears to perform a planetary motion.

In some examples, the outer diameter of the inner ring gear is less than or equal to 50 mm.

In some examples, the impact mechanism further includes a main shaft connecting the impact block to the drive shaft and a first bearing supporting the rotation of the main shaft, and the first bearing restrains axial displacement of the inner ring gear.

In some examples, the first bearing overlaps with the second planet carrier along the direction of the first axis.

In some examples, the ratio of a rotational speed of the drive shaft to a rotational speed of the main shaft is substantially a constant value.

In some examples, the gear ratio from the drive shaft to the main shaft is higher than or equal to 9.

In some examples, the inner ring gear separately causes the first planet gears and the second planet gears to perform planetary motions.

In some examples, the maximum rotational speed of the output shaft is less than or equal to 3000 rpm.

In some examples, the nominal voltage of the direct current power supply is greater than or equal to 3 V and less than or equal to 9 V.

In some examples, a housing is further included and is configured to have an accommodation space, where the motor is disposed in the accommodation space, and the distance L1 from the rear end of the housing to the front end of the output shaft is less than or equal to 145 mm.

In some examples, the distance L1 from the rear end of the housing to the front end of the output shaft is less than or equal to 135 mm.

In some examples, the transmission mechanism further includes a housing assembly, the housing assembly includes first recesses provided on the outer side of the housing assembly and extending inward and second recesses provided on the inner side of the housing assembly and extending outward, where the first recesses and the second recesses are circumferentially spaced apart.

In some examples, the diameter of the impact block is greater than or equal to 40 mm, and the mass of the impact block is greater than or equal to 120 g.

An impact tool includes: a motor including a drive shaft that rotates about a first axis; an output shaft including an output axis defined by the output shaft, where the output shaft rotates about the output axis to output power; an impact mechanism applying an impact force to the output shaft, where the impact mechanism includes an impact block driven by the motor and a hammer anvil mating with the impact block and impacted by the impact block; a transmission mechanism configured to transmit torque outputted from the drive shaft to the output shaft; and a direct current power supply powering at least the motor, where the nominal voltage of the direct current power supply is greater than or equal to 3 V and less than or equal to 9 V. Fastening torque of the output shaft on a workpiece is greater than or equal to 170 N·m.

An impact tool includes: a motor including a drive shaft that rotates about a first axis; an output shaft including an output axis defined by the output shaft, where the output shaft rotates about the output axis to output power; an impact mechanism applying an impact force to the output shaft, where the impact mechanism includes an impact block driven by the motor, a hammer anvil mating with the impact block and impacted by the impact block, and a main shaft connecting the impact block to the drive shaft; a transmission mechanism configured to transmit torque outputted from the drive shaft to the main shaft, where the gear ratio from the drive shaft to the main shaft is higher than or equal to 9; and a direct current power supply powering at least the motor, where the nominal voltage of the direct current power supply is greater than or equal to 3 V and less than or equal to 9 V. Fastening torque of the output shaft on a workpiece is greater than or equal to 170 N·m.

In some examples, the transmission mechanism includes a multi-stage transmission assembly, and the multi-stage transmission assembly includes at least two stages of planet gear reduction assemblies.

In some examples, the transmission mechanism includes: a first planet carrier disposed in front of the motor; first planet gears supported by the first planet carrier; a second planet carrier disposed in front of the first planet carrier; second planet gears supported by the second planet carrier; and an inner ring gear causing at least the second planet gears to perform a planetary motion.

In some examples, the ratio of a rotational speed of the drive shaft to a rotational speed of the main shaft is substantially a constant value.

DETAILED DESCRIPTION

Figure 1:
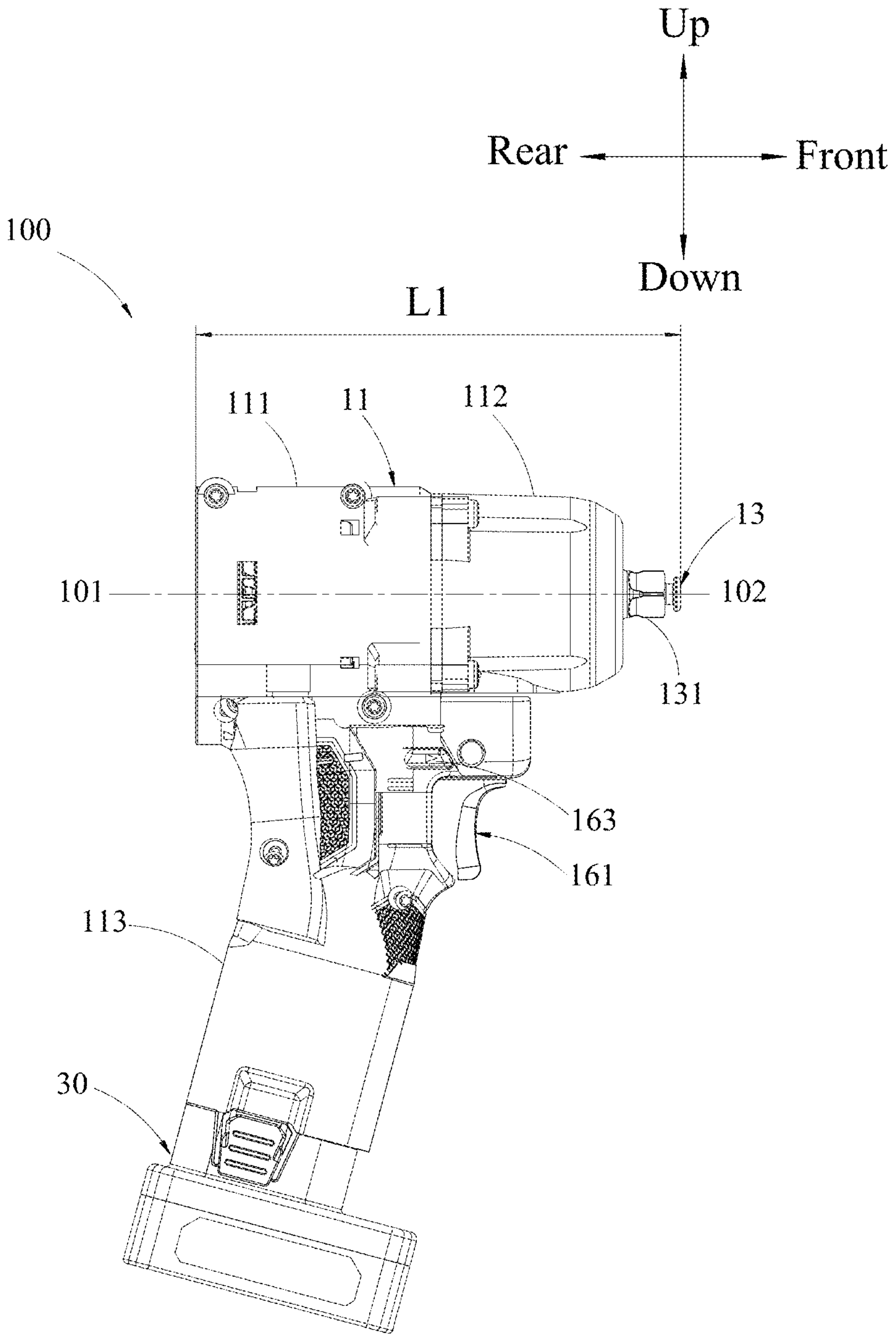
FIG. 1 is a structural view of an example in the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

To clearly illustrate the technical solutions of the present application, an upper side, a lower side, a front side, and a rear side shown in FIG. 1 are further defined.

Figure 2:
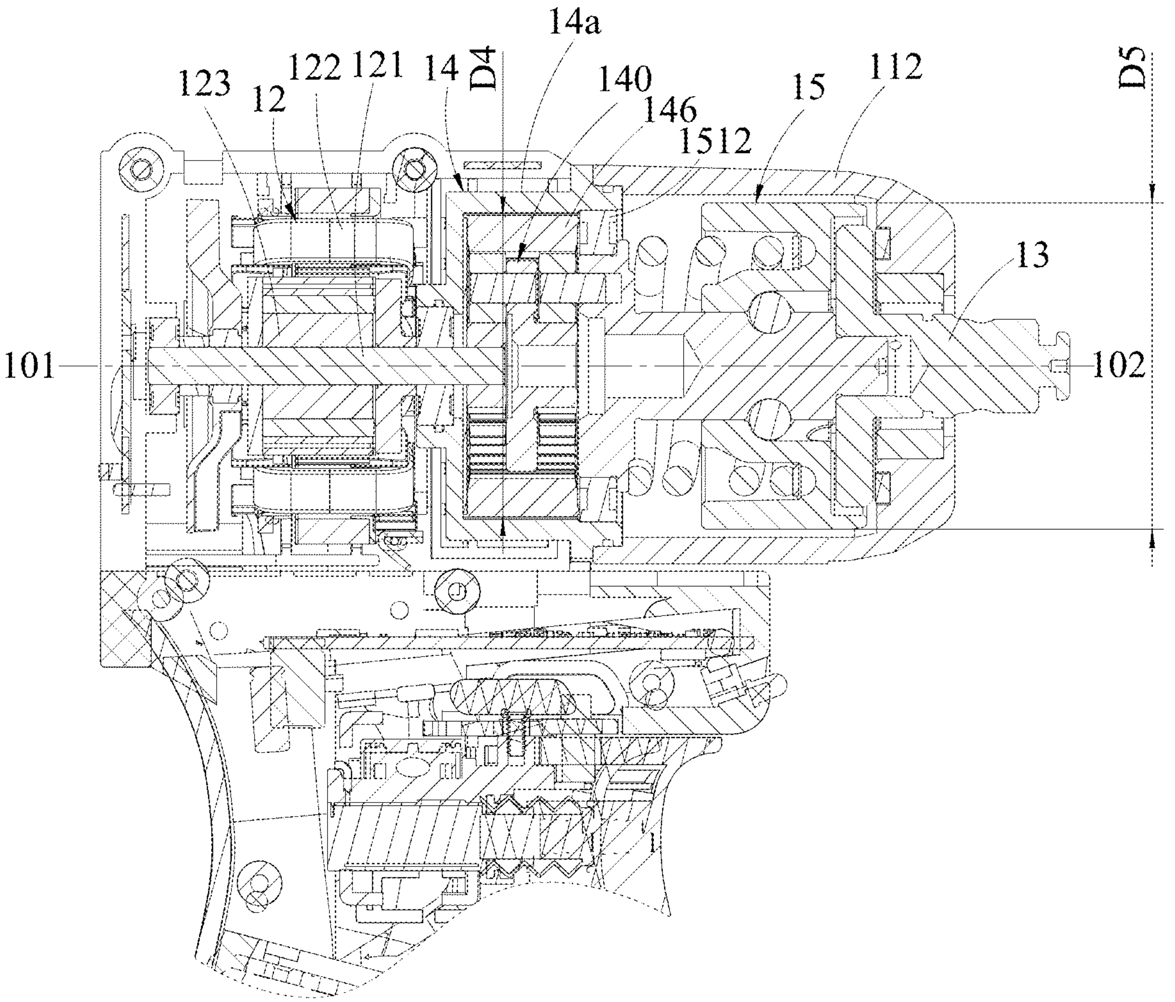
FIG. 2 is a sectional view of an example in the present application.

FIGS. 1 and 2 show an impact tool in a first example of the present application. In this example, the impact tool is an impact wrench 100. It is to be understood that the impact tool is a rotary tool. In other alternative examples, different working accessories may be mounted to the rotary tool so that with these different working accessories, the impact tool may be, for example, an impact screwdriver or an impact drill.

As shown in FIG. 1, the impact wrench 100 in an example of the present application includes a power supply. The power supply is configured to supply electrical energy to the impact wrench 100. In this example, the power supply includes a direct current power supply 30. For example, the direct current power supply 30 is a battery pack. Corresponding components in the impact wrench 100 are powered by the battery pack cooperating with a corresponding power supply circuit. It is to be understood by those skilled in the art that the power supply is not limited to the battery pack, and the corresponding components in the machine may be powered through mains electricity or an alternating current power supply in cooperation with corresponding rectifier, filter, and voltage regulation circuits. In this example, the direct current power supply 30 is specifically configured to be the battery pack. The battery pack 30 is used below instead of the direct current power supply, which is not intended to limit the present application.

As shown in FIGS. 1 to 5, the impact wrench 100 includes a housing 11, a motor 12, an output mechanism 13, a transmission mechanism 14, and an impact mechanism 15. The motor 12 includes a drive shaft 121 that rotates about a first axis 101. In this example, the motor 12 is specifically configured to be an electric motor. The electric motor 12 is used below instead of the motor, which is not intended to limit the present application. In this example, the electric motor 12 includes a stator assembly 122 and a rotor assembly 123. The rotor assembly 123 is formed with or connected to the drive shaft 121 that rotates about the first axis 101. In this example, the electric motor 12 is a brushless inrunner. In other alternative examples, the electric motor 12 is a brushless outrunner. In the inrunner, the stator assembly 122 is sleeved on the outer side of the rotor assembly 123. In the outrunner, the rotor assembly 123 is sleeved on the outer side of the stator assembly 122. In this example, the brushless motor is configured to be a three-phase brushless motor. It is to be understood that the electric motor is not limited to the three-phase brushless motor and may be another type of direct current motor. The above does not affect the substance of the present application.

The housing 11 includes an electric motor housing 111 for accommodating the electric motor 12 and an output housing 112 for accommodating at least part of the output mechanism 13. The output housing 112 is connected to the front end of the electric motor housing 111. The housing 11 is further formed with or connected to a grip 113 to be operated by a user. The grip 113 and the electric motor housing 111 form a T-shaped or L-shaped structure, which is convenient for the user to hold and operate. The battery pack 30 is connected to an end of the grip 113. The battery pack 30 is detachably connected to the grip 113.

The output mechanism 13 includes an output shaft 131 for connecting a working accessory and driving the working accessory to rotate. A clamping assembly is disposed at the front end of the output shaft 131 and can clamp different working accessories such as a bit, a drill bit, and a socket to implement corresponding functions.

The output shaft 131 is used for outputting power and rotates about an output axis 102. In this example, the first axis 101 coincides with the output axis 102. In other alternative examples, an angle of a certain degree exists between the output axis 102 and the first axis 101. In other alternative examples, the first axis 101 and the output axis 102 are parallel to each other but do not coincide with each other.

As shown in FIGS. 2 to 5, the impact mechanism 15 is used for applying an impact force to the output shaft 131. The impact mechanism 15 includes a main shaft 151, an impact block 152 sleeved on the circumference of the main shaft 151, a hammer anvil 153 disposed at the front end of the impact block 152, and an elastic element 154. The hammer anvil 153 is connected to the output shaft 131. In this example, the hammer anvil 153 includes an anvil 1531, and the output shaft 131 is formed at or connected to the front end of the anvil 1531. It is to be understood that the anvil 1531 and the output shaft 131 may be integrally formed or separately formed as independent parts.

The impact block 152 is driven to rotate by the drive shaft 121. The anvil 1531 mates with the impact block 152 and is impacted by the impact block 152. The main shaft 151 connects the impact block 152 to the drive shaft 121. In this example, the drive shaft 121 drives the main shaft 151, and the main shaft 151 drives the impact block 152 to rotate.

The impact block 152 includes an impact block body 1521 and a pair of first end teeth 1523 which are symmetrically disposed on and protrude from the front end face of the impact block body 1521 radially. A pair of second end teeth 1532 are symmetrically disposed on and protrude from the rear end surface of the anvil 1531 opposite to the impact block 152 radially. The output shaft 131 extends out of the output housing 112. The impact block 152 is supported on the main shaft 151 to rotate integrally with the main shaft 151 and is slidable back and forth relative to the main shaft 151 in the axial direction of the main shaft. In this example, the axis of the main shaft 151 coincides with the axis of the drive shaft 121. Therefore, the impact block 152 slides and rotates back and forth along the direction of the first axis 101 relative to the main shaft 151. In other alternative examples, the axis of the main shaft may be parallel to the axis of the drive shaft 121 but does not coincide with it. Alternatively, an included angle of a certain degree exists between the axis of the main shaft and the axis of the drive shaft 121.

The elastic element 154 provides a force for the impact block 152 to approach the hammer anvil 153. In this example, the elastic element 154 is a coil spring.

In a working process of the impact wrench 100, the impact block 152 moves back and forth along the direction of the first axis 101 at a predetermined stroke relative to the main shaft 151 while rotating integrally with the main shaft 151. A pair of first ball grooves 1522 that open forward and extend backward along a front and rear direction are provided on the front end surface of the impact block body 1521. A pair of V-shaped second ball grooves 1511 are formed on the outer surface of the main shaft 151. The first ball grooves 1522 and the second ball grooves 1511 each have semicircular groove bottoms. The impact mechanism 15 further includes rolling balls 155. The rolling balls 155 straddle the first ball grooves 1522 and the second ball grooves 1511 so that the impact block 152 and the main shaft 151 are connected to each other and move together. In this example, each of the rolling balls 155 is a steel ball.

In the related art, since the impact block and the main shaft are separately provided with inwardly recessed V-shaped grooves to form ball channels together, the rolling balls 155 are disposed between the impact block 152 and the main shaft 151 and embedded into the ball channels. Thus, the main shaft 151 can drive, through the rolling balls 155, the impact block 152 to rotate, and the impact block 152 mates with the hammer anvil 153 to drive the hammer anvil 153 to rotate so as to further drive the output shaft 131 to rotate.

When the impact wrench 100 works with no load, the impact mechanism 15 does not impact and plays a transmission role in transmitting the rotation of the electric motor 12 to the output shaft 131. When a load is applied to the impact wrench 100, the rotation of the output shaft 131 is blocked. The output shaft 131 may reduce a rotational speed or may completely stop rotating due to a different magnitude of the load. When the output shaft 131 completely stops rotating, the hammer anvil 153 also stops rotating. Due to the limitation of the hammer anvil 153 on the impact block 152 in a circumferential direction, the impact block 152 also stops rotating.

However, the main shaft 151 continues rotating such that the rolling balls 155 are pressed to move along the ball channels, thereby driving the impact block 152 to be displaced backward along the axis of the main shaft 151. At the same time, the elastic element 154 is pressed until the hammer anvil 153 is completely separated from the impact block 152. The main shaft 151 drives the impact block 152 to rotate at a certain rotational speed, and the elastic element 154 springs back along an axial direction. The relative rotational speed between the impact block 152 and the hammer anvil 153 is the rotational speed of the impact block 152. When the impact block 152 rotates to be in contact with the hammer anvil 153, the impact block 152 applies an impact force to the hammer anvil 153. Under the action of this impact force, the output shaft 131 overcomes the load and continues rotating by a certain angle, and then the output shaft 131 stops rotating again. The preceding process is repeated. Since an impact frequency is high enough, a relatively continuous impact force is applied to the output shaft 131 so that the working accessory works continuously.

Figure 3:
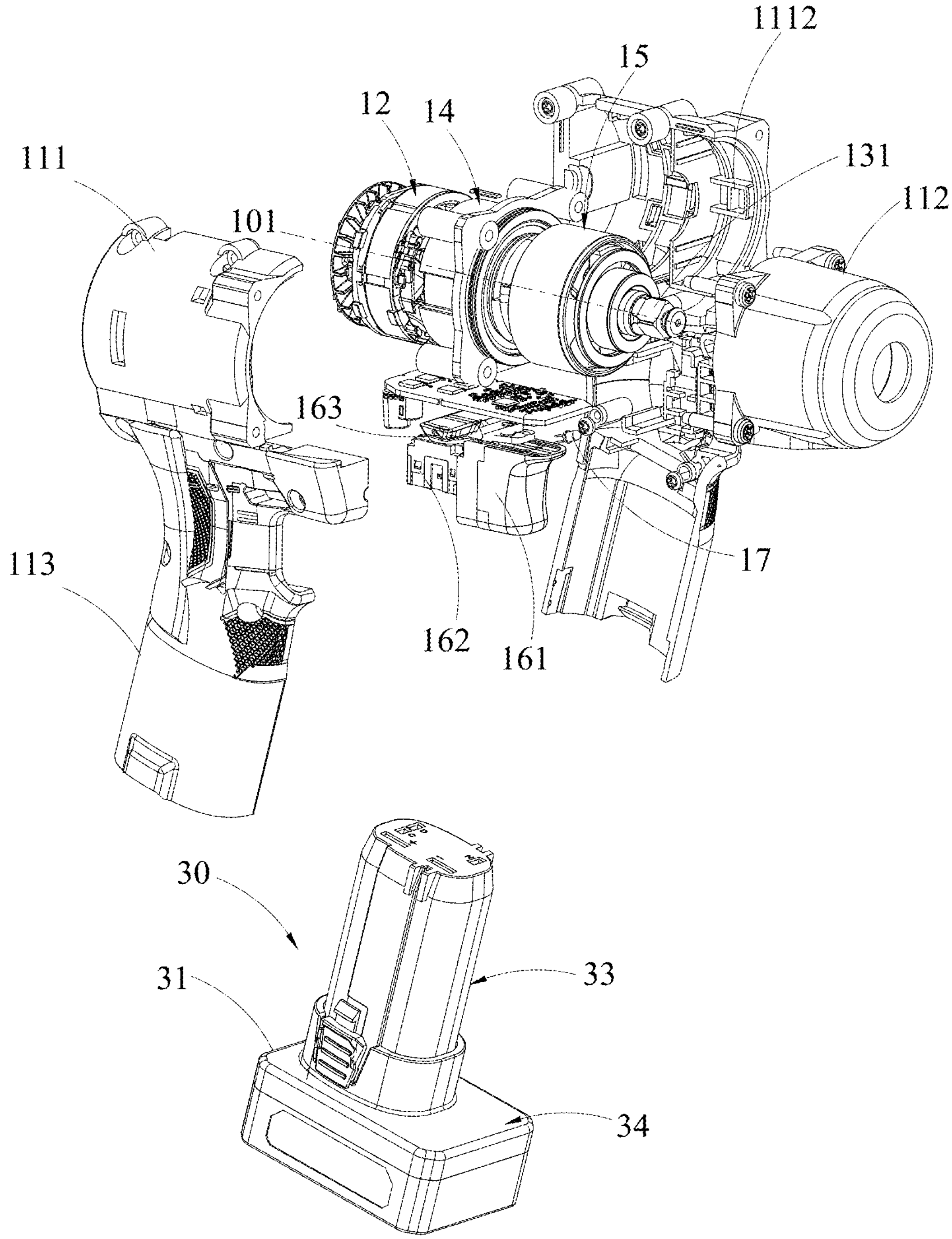
FIG. 3 is an exploded view of an example in the present application.

As shown in FIGS. 1 to 3, the impact wrench 100 further includes a main switch 161 and a switching portion 163. The main switch 161 is a trigger switch. The trigger switch is disposed on the grip 113 for the user to operate. The rotational speed of the electric motor 12 is adjusted according to a trigger stroke of the trigger switch. In this example, the trigger switch is coupled to a slide rheostat 162. With different trigger strokes of the trigger switch, the slide rheostat 162 outputs corresponding analog signals. The trigger stroke of the trigger switch is positively correlated to the duty cycle of a pulse-width modulation (PWM) signal of the electric motor 12, and the duty cycle of the PWM signal is positively correlated to the rotational speed of the electric motor 12. When the trigger stroke of the trigger switch is relatively short, the duty cycle of the PWM signal is also relatively small. In this case, the rotational speed of the electric motor 12 is also relatively low. In some examples, the mapping relationship between the trigger stroke of the trigger switch and the PWM signal is stored in the impact wrench. The mapping relationship may be linear or nonlinear, which is not limited in the examples of the present application.

The switching portion 163 is disposed on the upper side of the trigger switch and configured to be operated to cause the motor to rotate in a forward rotation direction in which a fastener is fastened or a reverse rotation direction in which the fastener is loosened.

As shown in FIGS. 2 to 5, the transmission mechanism 14 is configured to transmit torque outputted from the drive shaft 121 to the output shaft 131. In this example, the transmission mechanism 14 is disposed between the electric motor 12 and the impact mechanism 15 and used for transmitting power between the drive shaft 121 and the main shaft 151.

The transmission mechanism 14 reduces an output rotational speed of the drive shaft 121 and increases the torque of the drive shaft 121 so that when a load on the output shaft 131 exceeds a certain threshold, the main shaft 151 can drive the impact block 152 to compress the elastic element 154 to move backward. In this example, the nominal voltage of the battery pack 30 is less than 18 V. That is, when the battery pack 30 with a nominal voltage of less than 18 V powers the electric motor 12, fastening torque of the output shaft 131 of the impact wrench 100 on a workpiece is greater than or equal to 170 N·m. It is to be understood that the output shaft 131 transmits continuous rotational impacts on the workpiece and generates the fastening torque of at least 170 N·m when the battery pack 30 supplies the nominal voltage of less than 18V to the electric motor 12. The term "fastening torque" refers to the torque applied to the fastener in a direction in which tension is increased (that is, in a tightening direction). In this example, a gear ratio provided by the transmission mechanism 14 from the drive shaft 121 to the main shaft 151 is higher than or equal to 9 so that the output rotational speed of the electric motor 12, which is adapted for the nominal voltage of less than 18 V, can be reduced to a proper speed for the impact mechanism 15 to impact. In this example, the transmission mechanism 14 includes a multi-stage transmission assembly 140 to cause the gear ratio from the drive shaft 121 to the main shaft 151 to be higher than or equal to 9. In some examples, the nominal voltage of the battery pack 30 is greater than or equal to 3 V and less than or equal to 11 V. In some examples, the nominal voltage of the battery pack 30 is greater than or equal to 3 V and less than or equal to 9 V.

It can be learned from the related art that the output torque of the electric motor 12 is positively correlated with the power of the electric motor 12 while the output torque of the electric motor 12 is negatively correlated with the output rotational speed of the electric motor 12. Moreover, the power of the electric motor 12 is the product of a voltage applied to the electric motor 12 and a bus current. As can be seen, when the voltage applied to the electric motor 12 is reduced, if the electric motor 12 is required to output the same output torque or the same output power, it becomes necessary to increase the bus current, which means that the bus current is increased to compensate for a gap created by the voltage reduction. As a result, the cost of the electric motor 12 is increased. In addition, switching elements (for example, the switching elements include controllable semiconductor power devices (such as field-effect transistors (FETs), bipolar junction transistors (BJTs), or insulated-gate bipolar transistors (IGBTs)) or include bipolar junction transistors (BJTs) or insulated-gate bipolar transistors (IGBTs)) are used in the impact tool, and the ratio of the on time of the switching elements to the off time of the switching elements is controlled based on the pulse-width modulation (PWM) signal such that the movement state of the electric motor 12 is controlled. Therefore, when the bus current of the electric motor 12 is increased, higher requirements are also imposed on the switching elements. For the use of the switching elements, not only is the cost increased, but also requirements concerning heat dissipation and service lives are added. Therefore, for an impact tool in the related art, it is substantially impossible to use the battery pack with the nominal voltage of less than 18 V to power the impact tool when the fastening torque of the output shaft 131 on the workpiece is greater than or equal to 170 N·m.

However, an object of the present application is to ensure the usability and safety of the electric motor 12 and components in control circuits related to the electric motor 12. In the impact tool, the electric motor 12 is powered by the battery pack with the nominal voltage of less than 18 V, and the output torque, output rotational speed, or output power of the electric motor 12 is maintained through the increase in the gear ratio of the transmission mechanism 14 so that the output torque outputted from the electric motor 12 powered at the nominal voltage of less than 18 V to the impact mechanism 15 is maintained at an original level (the level in the case where the nominal voltage of a power supply battery pack is greater than or equal to 18 V). In this example, the gear ratio provided by the transmission mechanism 14 from the drive shaft 121 to the main shaft 151 is higher than or equal to 9. In some examples, the gear ratio provided by the transmission mechanism 14 from the drive shaft 121 to the main shaft 151 is higher than or equal to 9.5, 10, 10.5, 11, 11.5, or 12. In some examples, the gear ratio provided by the transmission mechanism 14 from the drive shaft 121 to the main shaft 151 is higher than or equal to 12 and lower than or equal to 14.

In this example, the fastening torque of the output shaft 131 of the impact wrench 100 on the workpiece is greater than or equal to 170 N·m. In some examples, the fastening torque of the output shaft 131 of the impact wrench 100 on the workpiece is greater than or equal to 180 N·m. The fastening torque of the output shaft 131 of the impact wrench 100 on the workpiece is greater than or equal to 190 N·m. The fastening torque of the output shaft 131 of the impact wrench 100 on the workpiece is greater than or equal to 200 N·m. In some examples, the fastening torque of the output shaft 131 of the impact wrench 100 on the workpiece is greater than or equal to 210 N·m and less than or equal to 400 N·m.

An object of this example is to ensure the usability and safety of the electric motor 12 and the components in the control circuits related to the electric motor 12. In the impact tool, the electric motor 12 is powered by the battery pack with the nominal voltage of less than 18 V, and the output torque, output rotational speed, or output power of the electric motor 12 is maintained through the increase in an torque output of the transmission mechanism 14 so that the output torque outputted from the electric motor 12 powered at the nominal voltage of less than 18 V to the impact mechanism 15 is maintained at the original level (the level in the case where the nominal voltage of the power supply battery pack is greater than or equal to 18 V). In this example, the transmission mechanism 14 includes the multi-stage transmission assembly 140. Optionally, the multi-stage transmission assembly 140 includes multiple stages of planetary transmission sets. For example, the multi-stage transmission assembly 140 includes at least two stages of planet gear reduction assemblies. The multi-stage transmission is used for reducing the speed and increasing the torque so that it can be ensured that the transmission mechanism 14 has a relatively high gear ratio. To obtain the same gear ratio, the multi-stage transmission assembly 140 has lower strength requirements on a single gear than a single-stage transmission assembly, which is more beneficial to the service lives of transmission elements.

Figure 4:
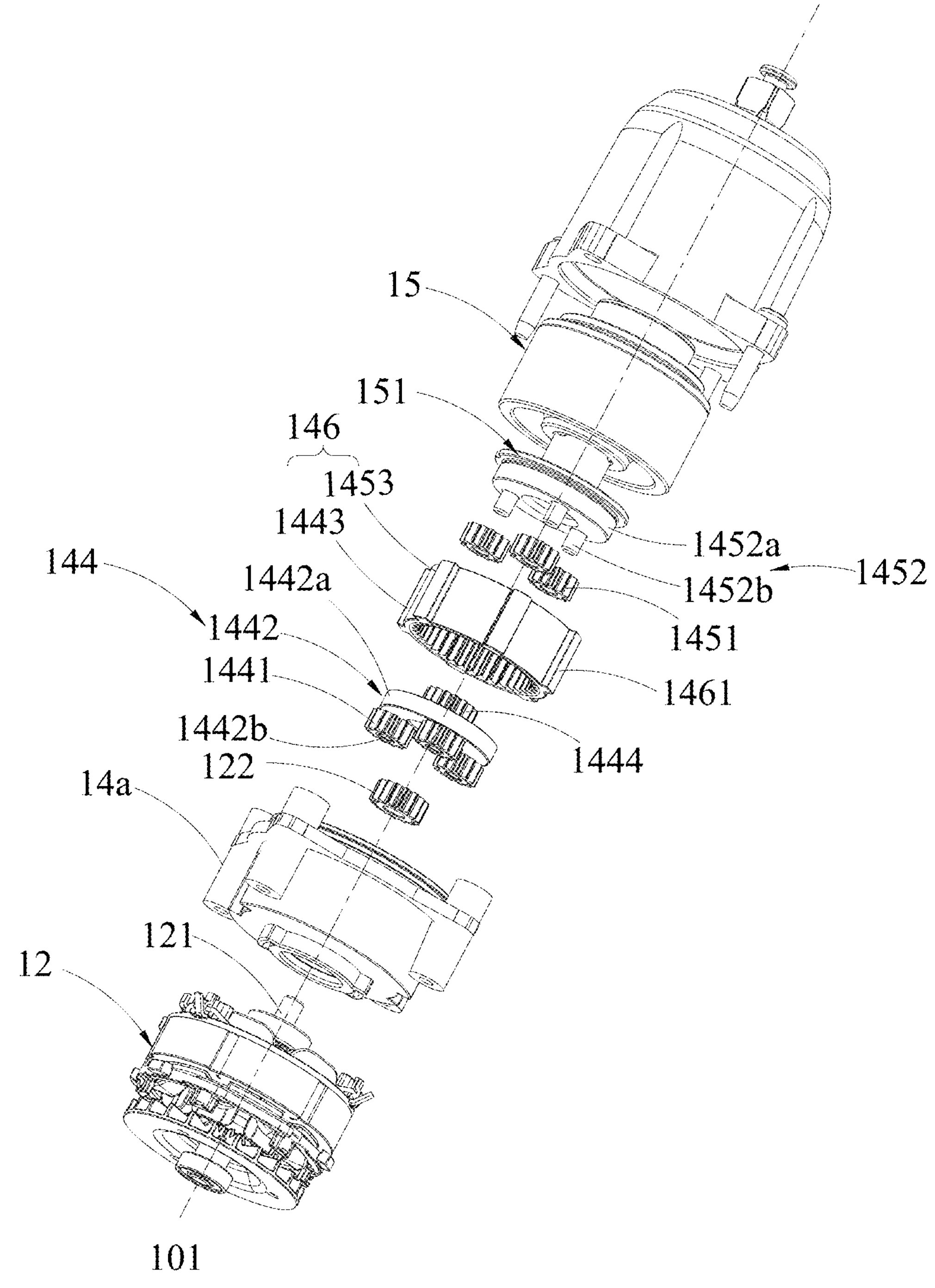
FIG. 4 is a partial exploded view of an example in the present application.
Figure 5:
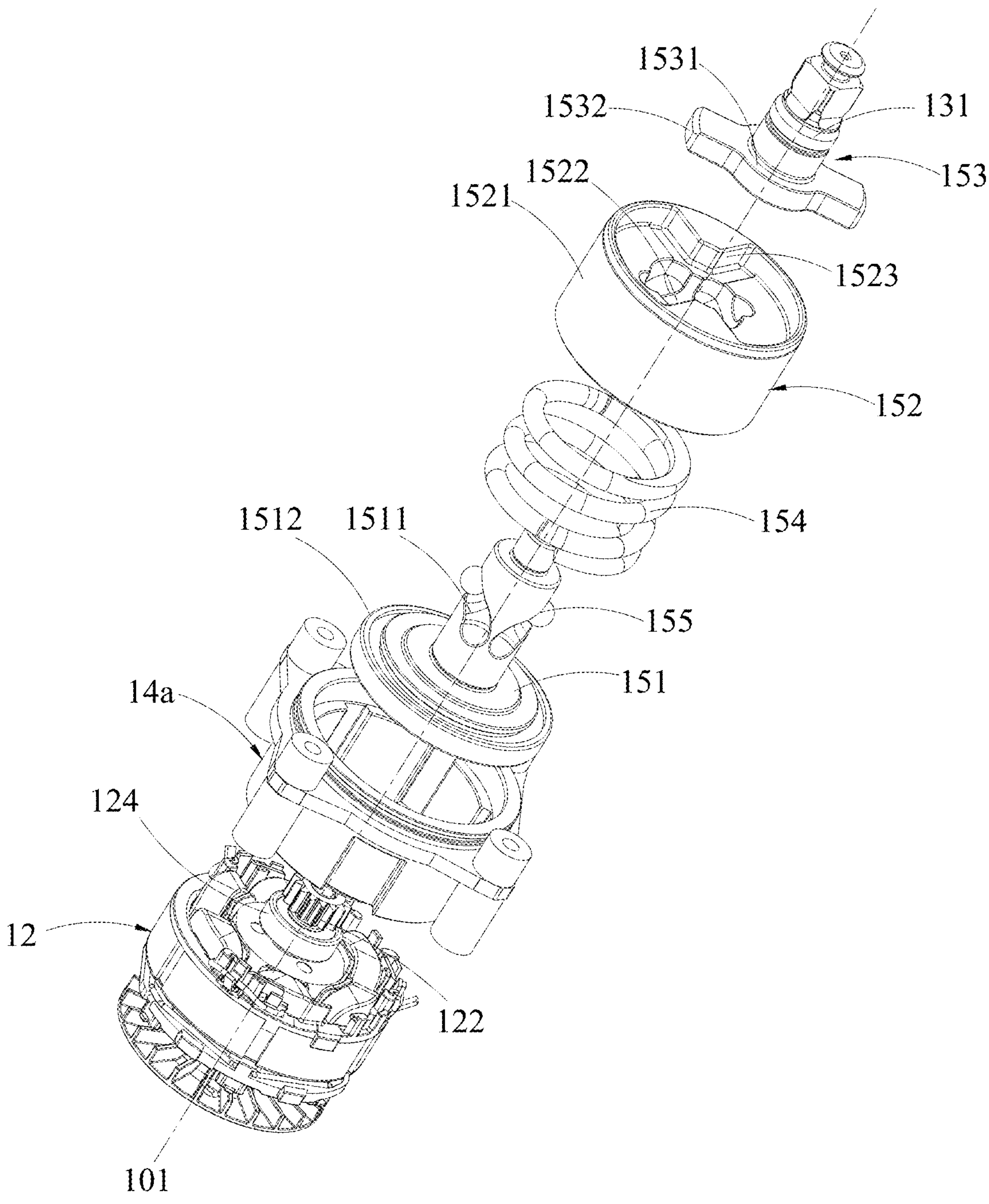
FIG. 5 is a partial exploded view of an example in the present application.

As shown in FIG. 4, the transmission mechanism 14 includes a housing assembly 14*a*, a first-stage planetary gear set 144, and a second-stage planetary gear set 145. It is to be understood that in this example, to ensure the short overall length of the impact wrench 100 as much as possible, the two stages of planetary gear sets are provided. However, according to actual product requirements, the transmission mechanism 14 may be provided with more than two stages of planetary gear sets. The above does not affect the substance of the present application.

As shown in FIGS. 2 to 4, the first-stage planetary gear set 144 and the second-stage planetary gear set 145 are at least partially located in the housing assembly 14*a*. The first-stage planetary gear set 144 is close to the drive shaft 121, and the second-stage planetary gear set 145 is close to the main shaft 151. In the multiple stages of planetary transmission sets 140, the planet carrier in a planetary transmission set close to the impact mechanism 15, that is, the second-stage planetary gear set 145 is formed on or connected to the main shaft 151. In this example, the gear ratio of the first-stage planetary gear set 144 is higher than 1, and the gear ratio of the second-stage planetary gear set 145 is higher than 1. In some examples, the gear ratio of at least one of the first-stage planetary gear set 144 and the second-stage planetary gear set 145 is higher than 1.

Optionally, the first-stage planetary gear set 144 includes first planet gears 1441, a first planet carrier 1442 for mounting the first planet gears 1441, and a first inner ring gear 1443 meshing with the first planet gears 1441. The drive shaft 121 is formed on or connected to a first sun gear 122 rotating at a first rotational speed. In this example, the first sun gear 122 and the drive shaft 121 rotate coaxially. Optionally, the first sun gear 122 rotates about the first axis 101. In other alternative examples, the first sun gear 122 is connected to the drive shaft 121.

The first sun gear 122 drives the first planet gears 1441. The first planet gears 1441 mesh with the first sun gear 122. Multiple first planet gears 1441 are provided, and all of the multiple first planet gears 1441 mesh with the first sun gear 122. In this example, three first planet gears 1441 are circumferentially disposed around the first axis 101 uniformly.

The first sun gear 122 and the first planet gears 1441 are formed with meshing tooth portions for transmitting the power. The tip circle diameter of the meshing tooth portion of the first sun gear 122 is smaller than the tip circle diameter of the first-stage planetary gear set 144 so that the number of meshing teeth of the first-stage planetary gear set 144 is greater than the number of teeth of the meshing tooth portion of the first sun gear 122. In some examples, the tip circle diameter of the meshing tooth portion of the first sun gear 122 is larger than the tip circle diameter of each of the first-stage planet gears 1441. The tip circle diameter of the meshing tooth portion of the first sun gear 122 is greater than or equal to 8 mm. The tip circle diameter of each of the first planet gears 1441 is less than 8 mm. Optionally, the tip circle diameter of the meshing tooth portion of the first sun gear 122 is greater than or equal to 9 mm. Optionally, the tip circle diameter of the meshing tooth portion of the first sun gear 122 is greater than or equal to 10 mm. Optionally, the tip circle diameter of the meshing tooth portion of the first sun gear 122 is greater than or equal to 11 mm. Optionally, the tip circle diameter of the meshing tooth portion of the first sun gear 122 is greater than or equal to 12 mm.

Optionally, the tip circle diameter of the meshing tooth portion of the first sun gear 122 is 13 mm. Optionally, the tip circle diameter of each of the first planet gears 1441 is 7.7 mm.

The first inner ring gear 1443 meshes with the periphery of the multiple first planet gears 1441. The first planet carrier 1442 includes a first drive disk 1442*a*, a first support frame 1442*b*, and a first output portion. The first support frame 1442*b* and the first output portion are formed on two sides of the first drive disk 1442*a*, respectively. The first output portion rotates in synchrony with the first drive disk 1442*a*. The first support frame 1442*b* is inserted into the first planet gears 1441 and rotatably connected to the first planet gears 1441 so that the first planet gears 1441 can drive the first planet carrier 1442 to rotate about the first axis 101. Meshing teeth are formed on the circumferential side of the first output portion. The first output portion is configured to mesh with the second-stage planetary gear set 145 so that the first-stage planetary gear set 144 and the second-stage planetary gear set 145 are drivingly connected to each other. In this example, the first output portion is a second sun gear 1444 in the second-stage planetary gear set 145.

The second-stage planetary gear set 145 includes second planet gears 1451, a second planet carrier 1452 for mounting the second planet gears 1451, and a second inner ring gear 1453 meshing with the second planet gears 1451. The second sun gear 1444 drives the second planet gears 1451. In this example, the second sun gear 1444 and the drive shaft 121 rotate coaxially. Optionally, the second sun gear 1444 rotates about the first axis 101. The second planet gears 1451 are configured to mesh with the second sun gear 1444. Multiple second planet gears 1451 are provided, and the multiple second planet gears 1451 mesh with the second sun gear 1444 separately. In this example, three second planet gears 1451 are circumferentially disposed around the first axis 101 uniformly. Meshing relationships between the second planet gears 1451, the second planet carrier 1452, and the second inner ring gear 1453 are the same as the meshing relationships in the first-stage planetary gear set 144 and are well-known to those skilled in the art. The details are not repeated here.

The second planet carrier 1452 includes a second drive disk 1452*a* and a second support frame 1452*b*. The second support frame 1452*b* is inserted into the second planet gears 1451 and rotatably connected to the second planet gears 1451 so that the second planet gears 1451 can drive the second drive disk 1452*a* to rotate about the first axis 101. In this example, the second drive disk 1452*a* is formed at the rear end of the main shaft 151. The second planet gears 1451 drive, through the second planet carrier 1452, the main shaft 151 to rotate. In other alternative examples, the second drive disk 1452*a* and the main shaft 151 may be independent components, and the second drive disk 1452*a* is connected to the main shaft 151 as long as the second planet gears 1451 can drive the main shaft 151 to rotate.

In this example, the ratio of the rotational speed of the drive shaft 121 to a rotational speed of the main shaft 151 is substantially a constant value. That is to say, the gear ratio from the drive shaft 121 to the main shaft 151 is substantially the constant value. Optionally, the first inner ring gear 1443 and the second inner ring gear 1453 are an integrally formed component. Optionally, the first inner ring gear 1443 and the second inner ring gear 1453 are the same component. That is, the transmission mechanism 14 includes an inner ring gear 146. The inner ring gear 146 separately causes the first planet gears 1441 and the second planet gears 1451 to perform planetary motions. The inner ring gear 146 not only meshes with the first planet gears 1441 to cause the first planet gears 1441 to perform the planetary motion but also meshes with the second planet gears 1451 to cause the second planet gears 1451 to perform the planetary motion. In some alternative examples, the first inner ring gear 1443 and the second inner ring gear 1453 are two components, and the first inner ring gear 1443 and the second inner ring gear 1453 are not displaced relative to each other to ensure that the gear ratio remains substantially constant.

It is to be noted that the electric motor 12, the transmission mechanism 14, and the impact mechanism 15 may share part of the structures. Therefore, the present disclosure does not intend to define the preceding devices as completely independent portions.

As shown in FIG. 2, along the direction of the first axis 101, a first bearing 1512 for supporting the main shaft 151 is closer to the output shaft 131 than the multiple stages of planetary transmission sets 140. The first bearing 1512 restrains axial displacement of the inner ring gear 146. Optionally, the first bearing 1512 overlaps with the second planet carrier 1452 along the direction of the first axis 101. Optionally, there is no overlap between the first bearing 1512 and the elastic element 154 along the direction of the first axis 101. Optionally, the first bearing 1512 is disposed in the housing assembly 14*a*.

Figure 6:
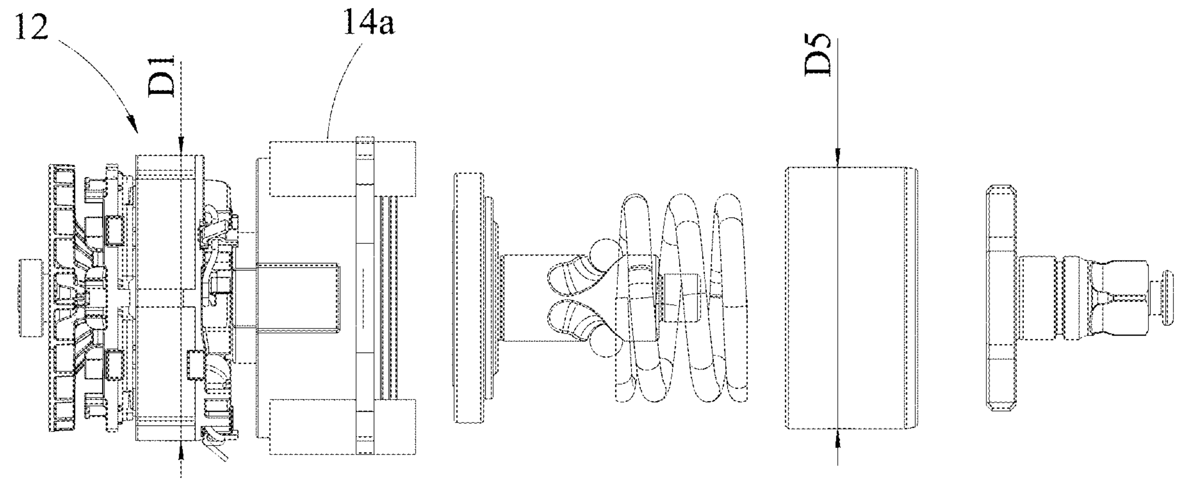
FIG. 6 is a partial exploded view of an example in the present application from another angle of view.

As shown in FIG. 6, the electric motor 12 is a brushless direct current (BLDC) motor. Optionally, the nominal diameter D1 of the stator of the brushless direct current inrunner 12 is less than or equal to 50 mm. For example, the nominal diameter D1 of the stator of the electric motor 12 is 48 mm. The rotational speed of the electric motor 12 is greater than or equal to 13000 rpm and less than or equal to 22000 rpm. As shown in FIGS. 5 to 9, a front bearing 124 of the electric motor for supporting the rotation of the drive shaft 121 is disposed at the front end of the electric motor 12. The front bearing 124 of the electric motor is positioned within the housing assembly 14*a*. The diameter D2 of the front bearing 124 of the electric motor is less than or equal to 20 mm. For example, the diameter D2 of the front bearing 124 of the electric motor is 16 mm. A positioning protrusion 147 for restraining axial displacement of the front bearing 124 of the electric motor is disposed in the housing assembly 14*a*. The diameter D3 of the hole formed by the positioning protrusion 147 is less than or equal to 18 mm. For example, the diameter D3 of the hole formed by the positioning protrusion 147 is 14 mm.

Figure 9:
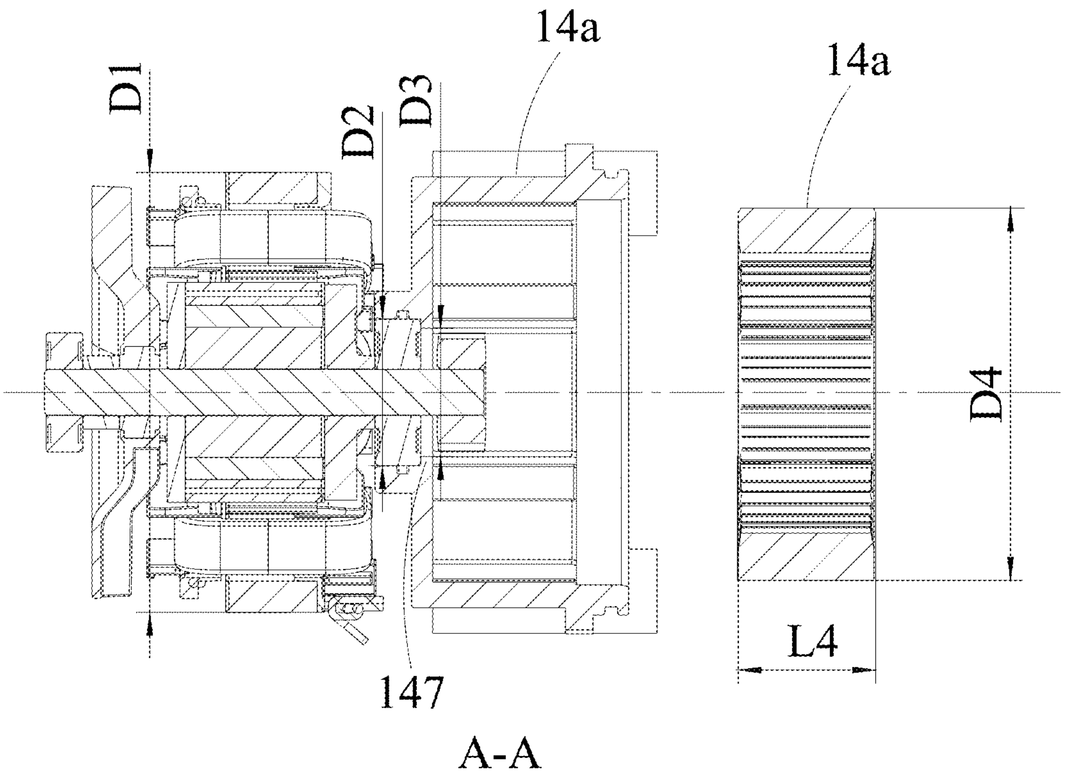
FIG. 9 is an exploded sectional view of components in FIG. 8 and an inner ring gear taken along A-A.

As shown in FIGS. 2 and 9, in this example, the diameter D4 of the inner ring gear 146 is less than or equal to 50 mm. Optionally, the diameter D4 of the inner ring gear 146 is less than or equal to 48 mm. Optionally, the diameter D4 of the inner ring gear 146 is less than or equal to 44 mm. Optionally, the diameter D4 of the inner ring gear 146 is less than or equal to 42 mm. Optionally, the diameter D4 of the inner ring gear 146 is less than or equal to 40 mm. In this example, the axial length of the inner ring gear 146 is set as L4. L4 represents the overall length of the inner ring gear. If the inner ring gear includes a first inner ring gear and a second inner ring gear that have a split structure, L4 represents the total length of the first inner ring gear and the second inner ring gear that are mounted in place. As shown in FIG. 9, when the inner ring gear 146 has an integrated structure, L4 represents the axial length of the inner ring gear 146. In this example, the ratio of the diameter D4 of the inner ring gear 146 to the length L4 of the inner ring gear 146 is lower than or equal to 8.5. In some examples, the ratio of the diameter D4 of the inner ring gear 146 to the length L4 of the inner ring gear 146 is lower than or equal to 8, 7.5, 7, 6.5, or 6.

Thus, it is ensured that the transmission mechanism outputs a relatively high gear ratio, and a compact radial dimension can be ensured, thereby ensuring the compactness of the entire machine.

As shown in FIG. 6, the mass of the impact block 152 and/or the rotational speed of the impact block 152 are increased so that the impact wrench 100 outputs higher torque, providing additional kinetic energy during the impact. In this example, the diameter D5 of the impact block 152 is limited to be greater than or equal to 40 mm. Optionally, the diameter D5 of the impact block 152 is 44 mm. Optionally, the mass of the impact block 152 is greater than or equal to 120 g. In some examples, the mass of the impact block 152 is greater than or equal to 125 g. The rotational inertia of the impact block 152 is greater than or equal to 35 kg·mm$^2$. The impact block 152 can meet the output torque requirement of the impact wrench 100 and can also ensure the compactness of the entire machine. In this example, the diameter D4 of the inner ring gear 146 is smaller than the diameter D5 of the impact block 152. In this example, the impact frequency is higher than or equal to 2500 IPM and lower than or equal to 3900 IPM. As defined herein, the "impact frequency" refers to the number of impacts applied to the hammer anvil 153 by the impact block 152 per unit time. IPM represents "the number of impacts per minute". The maximum rotational speed of the output shaft 131 is less than or equal to 3000 rpm. In some examples, the maximum rotational speed of the output shaft 131 is less than or equal to 2500 rpm. In some examples, the idle speed of the output shaft 131 is less than or equal to 3000 rpm. In some examples, the idle speed of the output shaft 131 is less than or equal to 2500 rpm. The idle speed refers to the "output speed" of the impact tool limited by common rotation of the main shaft 151, the impact block 152, and the hammer anvil 153 when the output shaft 131 is not used for applying the torque to the workpiece during the operation of the impact tool in an idle state. The idle speed is measured in the number of rotations per minute.

Figure 7:
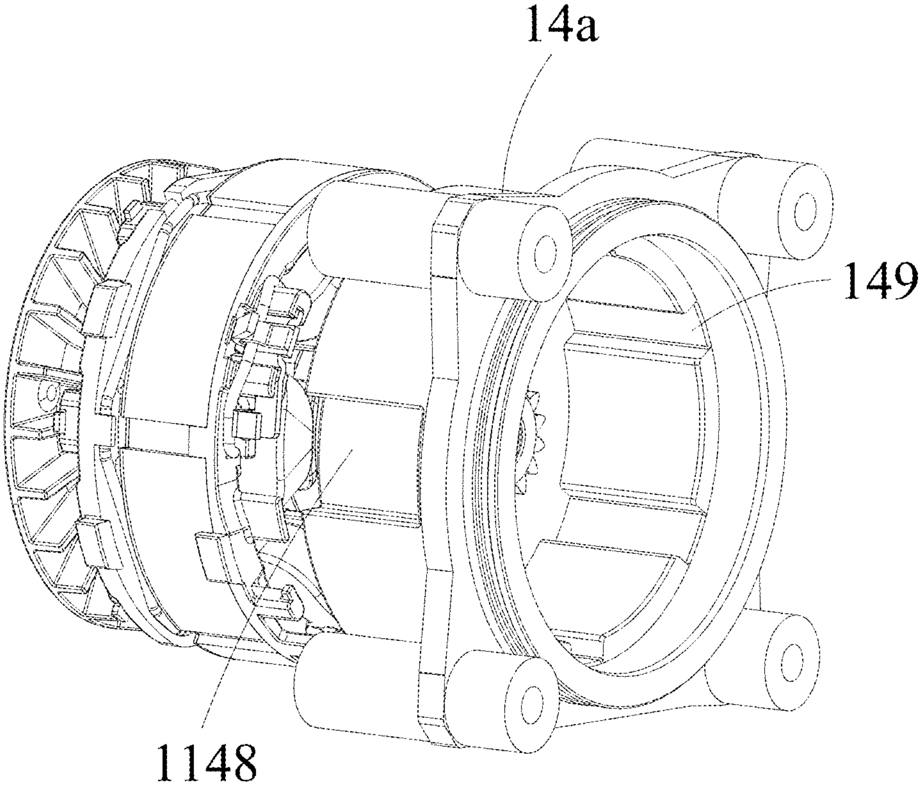
FIG. 7 is a structural view of part of components in FIG. 6.
Figure 8:
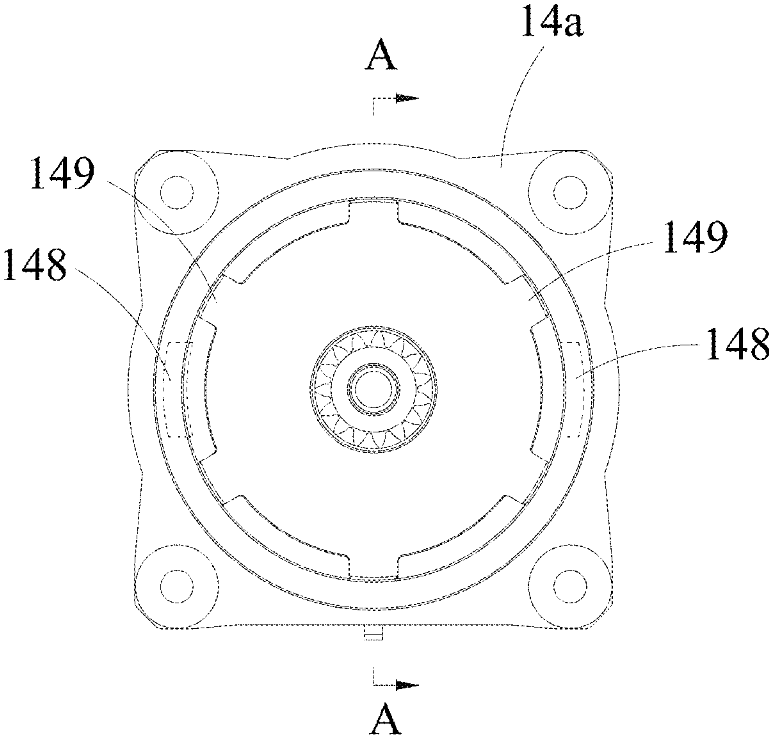
FIG. 8 is a schematic view of FIG. 7 from another angle of view.

As shown in FIGS. 7 to 9, to ensure the compactness of the impact wrench 100 in a radial direction, first recesses 148 are provided on the outer side of the housing assembly 14*a*. As shown in FIG. 3, the first recesses 148 mate with protrusions 1112 on the inner side of the electric motor housing 111 to restrain a circumferential movement of the housing assembly 14*a*. Second recesses 149 that extend radially outward are provided on the inner sidewall of the housing assembly 14*a*. The second recesses 149 mate with limit protrusions 1461 of the inner ring gear 146 to restrain a circumferential movement of the inner ring gear 146. To ensure the overall strength of the housing assembly 14*a* and the manufacturability of a mould, the second recesses 149 and the first recesses 148 are staggered to ensure a uniform wall thickness of the housing assembly 14*a*. Optionally, multiple second recesses 149 are uniformly provided along the circumferential direction. Six second recesses 149 are provided within a circumference of 360°. Multiple first recesses 148 are provided along the circumferential direction. Optionally, two first recesses 148 are provided within a circumference of 360°. Optionally, each of the first recesses 148 is provided between two adjacent second recesses 149. Optionally, each of the first recesses 148 overlaps with a respective second recess 149 along the radial direction so that the radial dimension of the transmission mechanism is reduced. Furthermore, the radial dimension of the entire machine is ensured.

Figure 10:
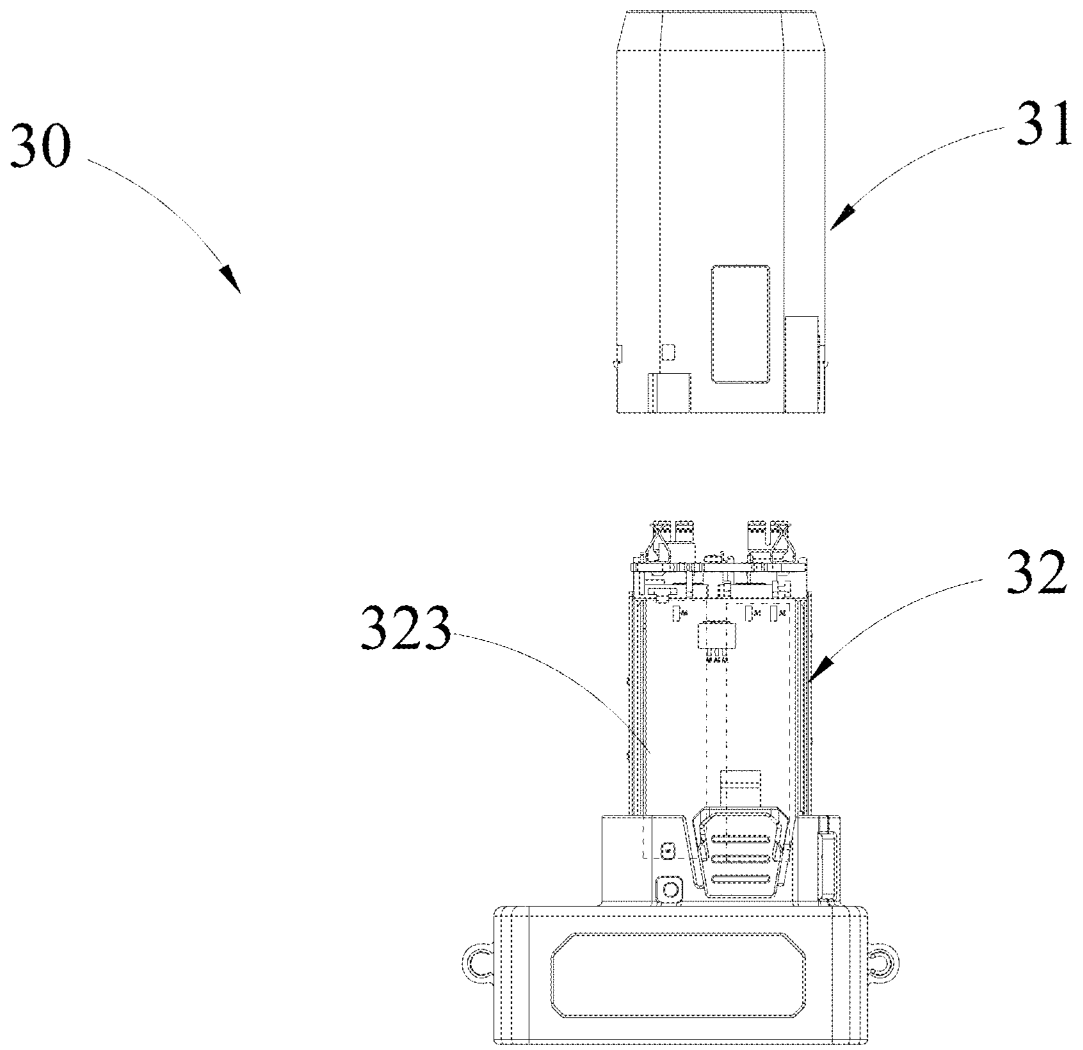
FIG. 10 is a partial exploded view of a battery pack according to an example in the present application.
Figure 11:
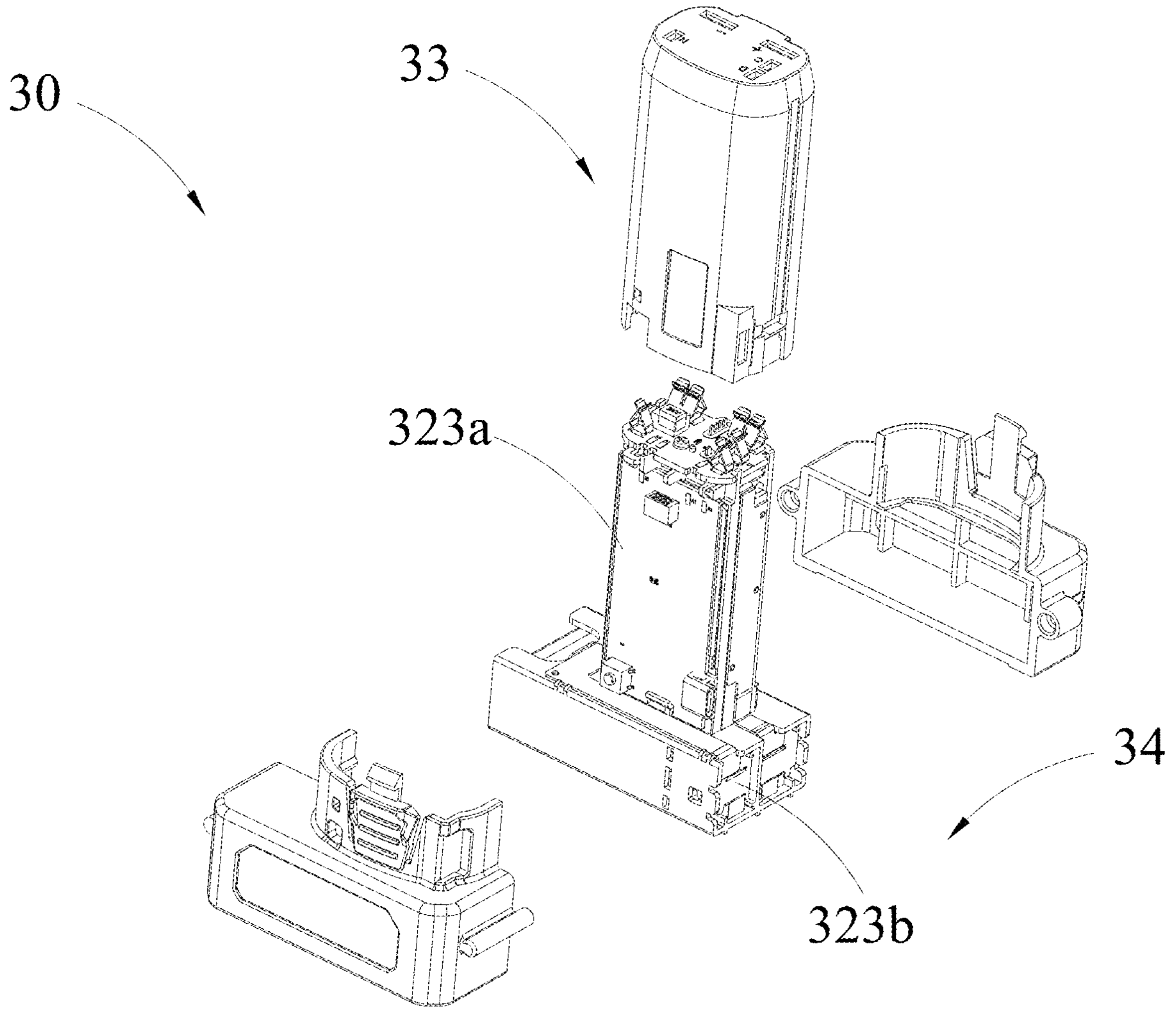
FIG. 11 is a partial exploded view of a battery pack according to an example in the present application.

FIGS. 10 and 11 show the battery pack 30. The nominal voltage of the battery pack 30 is less than 18 V. In some examples, the nominal voltage of the battery pack 30 is greater than or equal to 3 V and less than or equal to 9 V. The nominal voltage typically refers to a voltage specified by a manufacturer or a vendor on the label, package, user manual, specification, advertisement, marketing document, or another support document of the battery pack so that a user knows which power tools can run with the battery pack 30. Alternatively, the nominal voltage of the battery pack 30 may be detected or calculated. The nominal voltage may be a voltage of the battery pack 30 when the state of charge (SOC) of cells in the battery pack is 50%. Optionally, the battery pack 30 includes a battery pack housing 31 and a cell 32. A voltage of a single cell unit 323 is typically 3.6 V to 4.2 V. In this example, the battery pack 30 includes two to five cell units 323. The cell units 323 are connected in series, so the nominal voltage of the battery pack 100 may be considered 8 V to 18 V.

It is to be understood that the nominal voltage of the battery pack 30 is related to the number of cell units 323 connected in series in the battery pack 30. For example, when the number of cell units 323 in the battery pack 30 is 1, the nominal voltage of the battery pack 30 may be considered 3.6 V to 4.2 V and specifically, 3.6 V, 4 V, or 4.2 V.

In some examples, the nominal voltage of the battery pack 30 is greater than or equal to 3 V and less than 18 V. Similarly, when the number of cell units 323 connected in series in the battery pack 30 is 3, the nominal voltage of the battery pack 30 may be considered 10.8 V to 12.6 V and specifically, 10.8 V, 12 V, or 12.6 V. Similarly, when the number of cell units 323 connected in series in the battery pack 30 is 4, the nominal voltage of the battery pack 30 may be considered 14.4 V to 16.8 V and specifically, 14.4 V, 16 V, or 16.8 V.

In this example, the nominal voltage of the battery pack 30 is greater than or equal to 7 V and less than or equal to 9 V. For example, in this example, if the number of cell units 323 is 2 and the two cell units 323 are connected in series, the nominal voltage of the battery pack 30 may be considered 7.2 V to 8.4 V and specifically, 7.2 V, 8 V, or 8.4 V.

In some other examples, the number of cell units 323 in the battery pack 30 is less than or equal to 4. Four cell units 323 may be connected in series. Alternatively, four cell units 323 may constitute two cell groups, the two cell groups are connected in parallel, and two cell units 323 in each cell group are connected in series. When the four cells constitute the two cell groups, similarly, the nominal voltage of the battery pack 30 may be considered 8 V. In some examples, the nominal voltage of the battery pack 30 is less than or equal to 9 V. In some examples, the nominal voltage of the battery pack 30 is greater than or equal to 7 V.

In some examples, the nominal voltage of the battery pack 30 is less than or equal to 13 V. For example, the battery pack 30 includes three cell units 323 connected in series, and the nominal voltage of the battery pack 30 may be 10.8 V, 12 V, or 12.6 V.

The battery pack 30 may be a lithium battery pack, a solid-state battery pack, or a pouch battery pack. The battery pack 30 includes a first portion 33 and a second portion 34. When the battery pack 30 is coupled to the grip 113, the first portion 33 is at least partially located inside the grip 113, and the second portion 34 is located outside the grip 113. Optionally, the first portion 33 includes a first group of cells, and the second portion 34 includes a second group of cells. For convenience of description, in this example, a cell unit 323 in the first group of cells may be defined as a first cell unit 323*a*, and a cell unit 323 in the second group of cells may be defined as a second cell unit 323*b*. The first cell unit 323*a* and the second cell unit 323*b* are each a pouch cell. The first cell unit 323*a* is partially or entirely located inside the grip 113, and the second cell unit 323*b* is located outside the grip 113. An extension plane of the first cell unit 323*a* is parallel to a first straight line. An extension plane of the second cell unit 323*b* is perpendicular to the first straight line. The extension plane of the second cell unit 323*b* is perpendicular to the extension plane of the first cell unit 323*a*. The battery pack housing 31 is used for accommodating the first cell unit 323*a* and the second cell unit 323*b*. The battery pack housing is substantially T-shaped. Thus, the capacity of the battery pack 30 is increased and the volume of the battery pack can be reduced. Alternatively, in some examples, the battery pack housing may be substantially L-shaped.

In this example, as shown in FIG. 1, the axial length L1 from the rear end of the housing 11 to the front end of the hammer anvil 153 is less than or equal to 145 mm. In some examples, the axial length L1 from the rear end of the housing 11 to the front end of the hammer anvil 153 is less than or equal to 140 mm. In some examples, the axial length L1 from the rear end of the housing 11 to the front end of the hammer anvil 153 is less than or equal to 135 mm. In some examples, the axial length L1 from the rear end of the housing 11 to the front end of the hammer anvil 153 is less than or equal to 125 mm. In this example, since the output shaft 131 and the hammer anvil 153 are an integrally formed component and the output shaft 131 is disposed at the front end of the hammer anvil 153, it can be seen that the axial length L1 from the rear end of the housing 11 to the front end of the output shaft 131 is less than or equal to 145 mm. In some examples, the axial length L1 from the rear end of the housing 11 to the front end of the output shaft 131 is less than or equal to 140 mm. In some examples, the axial length L1 from the rear end of the housing 11 to the front end of the output shaft 131 is less than or equal to 135 mm. In some examples, the axial length L1 from the rear end of the housing 11 to the front end of the output shaft 131 is less than or equal to 125 mm. The battery pack with a low nominal voltage is used so that the output torque is ensured and the overall axial length of the impact tool is also maintained. Thus, the compactness of the entire machine is not affected, and the product can be conveniently applied in the working condition of a small and narrow space.

As shown in FIG. 3, the impact wrench 100 further includes an illumination assembly 17. The illumination assembly is configured to illuminate a working area of the impact wrench 100. The illumination assembly 17 is disposed at the lower portion of the output housing 112 or located in an area below the output housing 112.

In some alternative examples, the illumination assembly is disposed on the output housing. Optionally, the illumination assembly includes multiple light emitters disposed along the circumferential direction of the output shaft 131 or annularly. Each of the light emitters includes a light bead and a light plate. In some examples, the illumination assembly includes light beads and a reflector to provide a surface light source. Optionally, the reflector is annular. In some examples, the illumination assembly is controlled by the trigger switch. In some examples, an independent control manipulation portion is provided to control the illumination assembly. In some examples, the illumination assembly has an adjustable working mode. The working mode includes brightness, a color temperature, a turn-on delay, a turn-off delay, being constantly on or flashing, and other modes that affect an illumination effect.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. An impact tool, comprising:

a motor comprising a drive shaft that rotates about a first axis;

an output shaft that rotates about an output axis;

an impact mechanism applying an impact force to the output shaft, wherein the impact mechanism comprises an impact block driven by the motor and a hammer anvil mating with the impact block and impacted by the impact block;

a transmission mechanism configured to transmit torque outputted from the drive shaft to the output shaft, wherein the transmission mechanism comprises a multi-stage transmission assembly; and a direct current power supply powering at least the motor, wherein a nominal voltage of the direct current power supply is greater than or equal to 3V and less than or equal to 9V, and a fastening torque of the output shaft on a workpiece is greater than or equal to 170 N·m.

2. The impact tool according to claim 1, wherein the multi-stage transmission assembly comprises at least two stages of planet gear reduction assemblies.

3. The impact tool according to claim 2, wherein the distance L1 from the rear end of the housing to the front end of the output shaft is less than or equal to 125 mm.

4. The impact tool according to claim 1, wherein the multi-stage transmission assembly comprises:

a first planet carrier disposed in front of the motor;

first planet gears supported by the first planet carrier;

a second planet carrier disposed in front of the first planet carrier;

second planet gears supported by the second planet carrier; and an inner ring gear causing at least the second planet gears to perform a planetary motion.

5. The impact tool according to claim 4, wherein an outer diameter of the inner ring gear is less than or equal to 50 mm.

6. The impact tool according to claim 4, wherein the impact mechanism further comprises a main shaft connecting the impact block to the drive shaft and a first bearing supporting rotation of the main shaft, and the first bearing restrains axial displacement of the inner ring gear.

7. The impact tool according to claim 6, wherein the first bearing overlaps with the second planet carrier along a direction of the first axis.

8. The impact tool according to claim 6, wherein a ratio of a rotational speed of the drive shaft to a rotational speed of the main shaft is a constant value.

9. The impact tool according to claim 6, wherein a gear ratio of the transmission mechanism from the drive shaft to the main shaft is higher than or equal to 9.

10. The impact tool according to claim 4, wherein the inner ring gear separately causes the first planet gears and the second planet gears to perform planetary motions.

11. The impact tool according to claim 1, wherein a maximum rotational speed of the output shaft is less than or equal to 3000 rpm.

12. The impact tool according to claim 1, further comprising a housing configured to have an accommodation space, wherein the motor is disposed in the accommodation space, and a distance L1 from a rear end of the housing to a front end of the output shaft is less than or equal to 145 mm.

13. The impact tool according to claim 12, wherein the distance L1 from the rear end of the housing to the front end of the output shaft is less than or equal to 135 mm.

14. The impact tool according to claim 1, wherein the transmission mechanism further comprises a housing assembly, the housing assembly comprises first recesses provided on an outer side of the housing assembly and extending inward and second recesses provided on an inner side of the housing assembly and extending outward, and the first recesses and the second recesses are circumferentially spaced apart.

15. The impact tool according to claim 1, wherein a diameter of the impact block is greater than or equal to 40 mm, and a mass of the impact block is greater than or equal to 120 g.

16. An impact tool, comprising:

a motor comprising a drive shaft that rotates about a first axis;

an output shaft that rotates about an output axis;

an impact mechanism applying an impact force to the output shaft, wherein the impact mechanism comprises an impact block driven by the motor and a hammer anvil mating with the impact block and impacted by the impact block;

a transmission mechanism configured to transmit torque outputted from the drive shaft to the output shaft, wherein the transmission mechanism comprises two stages of planet gear reduction assemblies; and a direct current power supply powering at least the motor, wherein a nominal voltage of the direct current power supply is greater than or equal to 3 V and less than or equal to 9 V, a fastening torque of the output shaft on a workpiece is greater than or equal to 170 N·m, and a distance L1 from the rear end of the housing to the front end of the output shaft is less than or equal to 135 mm.

17. An impact tool, comprising:

a motor comprising a drive shaft that rotates about a first axis;

an output shaft that rotates about an output axis;

an impact mechanism applying an impact force to the output shaft, wherein the impact mechanism comprises an impact block driven by the motor, a hammer anvil mating with the impact block and impacted by the impact block, and a main shaft connecting the impact block to the drive shaft;

a transmission mechanism configured to transmit torque outputted from the drive shaft to the main shaft, wherein a gear ratio of the transmission mechanism from the drive shaft to the main shaft is higher than or equal to 9; and a direct current power supply powering at least the motor, wherein a nominal voltage of the direct current power supply is greater than or equal to 3 V and less than or equal to 9 V and a fastening torque of the output shaft on a workpiece is greater than or equal to 170 N·m.

18. The impact tool according to claim 17, wherein the transmission mechanism comprises a multi-stage transmission assembly, and the multi-stage transmission assembly comprises at least two stages of planet gear reduction assemblies.

19. The impact tool according to claim 17, wherein the transmission mechanism comprises:

a first planet carrier disposed in front of the motor;

first planet gears supported by the first planet carrier;

a second planet carrier disposed in front of the first planet carrier;

second planet gears supported by the second planet carrier; and an inner ring gear causing at least the second planet gears to perform a planetary motion.

20. The impact tool according to claim 17, wherein a ratio of a rotational speed of the drive shaft to a rotational speed of the main shaft is a constant value.

* * * * *